US011947500B2

(12) United States Patent
Wang et al.

(10) Patent No.: US 11,947,500 B2
(45) Date of Patent: Apr. 2, 2024

(54) CLOUD MIGRATION FOR LEGACY ON-PREMISES PROCESS CODE

(71) Applicant: SAP SE, Walldorf (DE)

(72) Inventors: Yu Wang, Xi'an (CN); Moritz Semler, Spechbach (DE); Kai Mueller, Wiesloch (DE); Le Zhang, Xi'an (CN); Zuosui Wu, Xi'an (CN); Haoxing Hou, Xi'an (CN)

(73) Assignee: SAP SE, Walldorf (DE)

( * ) Notice: Subject to any disclaimer, the term of this patent is extended or adjusted under 35 U.S.C. 154(b) by 33 days.

(21) Appl. No.: 17/482,914

(22) Filed: Sep. 23, 2021

(65) Prior Publication Data

US 2023/0089662 A1    Mar. 23, 2023

(51) Int. Cl.
*G06F 16/182* (2019.01)
*G06F 16/11* (2019.01)

(52) U.S. Cl.
CPC ........ *G06F 16/1824* (2019.01); *G06F 16/122* (2019.01)

(58) Field of Classification Search
CPC ............................ G06F 16/1824; G06F 16/122
See application file for complete search history.

(56) References Cited

U.S. PATENT DOCUMENTS 10,637,952 B1 *   4/2020  Koenig ............... H04L 67/1031
2019/0303379 A1 * 10/2019  Waas .................... G06F 16/252

OTHER PUBLICATIONS

"AWS Database Migration Service User Guide Using Apache Kafka as a target", Amazon Web Services, [Online]. Retrieved from the Internet: <URL: https://web.archive.org/web/20210703132928if_/https://docs.aws.amazon.com/dms/latest/userguide/dms-ug.pdf>, (Jul. 30, 2021), 120 pgs.

"European Application Serial No. 221965072, Extended European Search Report dated Jan. 20, 2023", 10 pgs.

"SAP HANA on AWS SAP HANA Guides", Amazon Web Services, [Online]. Retrieved from the Internet: <URL: https://docs.aws.amazon.com/sap/latest/sap-hana/welcome.html>, (Jun. 1, 2020), 400 pgs.

* cited by examiner

*Primary Examiner* — Mark D Featherstone
*Assistant Examiner* — Samuel C Sharpless, III
(74) *Attorney, Agent, or Firm* — SCHWEGMAN LUNDBERG & WOESSNER, P.A.

(57) ABSTRACT

Various examples are directed to systems and methods for operating a database management system (DBMS) in a cloud environment. An assembly worker executing at a first computing device may provide a first database protocol message generated by a process code executing at the first computing device. A translation engine executed at the cloud environment may translate the first database protocol message from a first format to a second format associated with a DBMS instance executing at the cloud environment to generate a translated first database protocol message. The translation engine may cause the translated first database protocol message to be provided to the DBMS instance and may receive, from the DBMS instance, a first reply corresponding to the translated first database protocol message. The first reply may be sent to the process code.

20 Claims, 7 Drawing Sheets

CLOUD MIGRATION FOR LEGACY ON-PREMISES PROCESS CODE

BACKGROUND

Traditionally, software has been self-contained and executed on one or more local machines. An enterprise desiring to use a software tool builds an on-premises computing system and executes a software application to provide the tool on that computing system. The software application may be developed by the enterprise and/or purchased from a third party software provider. Users access the software tool directly from the computing system or remotely via a networked user computing device.

BRIEF DESCRIPTION OF DRAWINGS

The present disclosure is illustrated by way of example and not limitation in the following figures.

DETAILED DESCRIPTION

Figure 1:
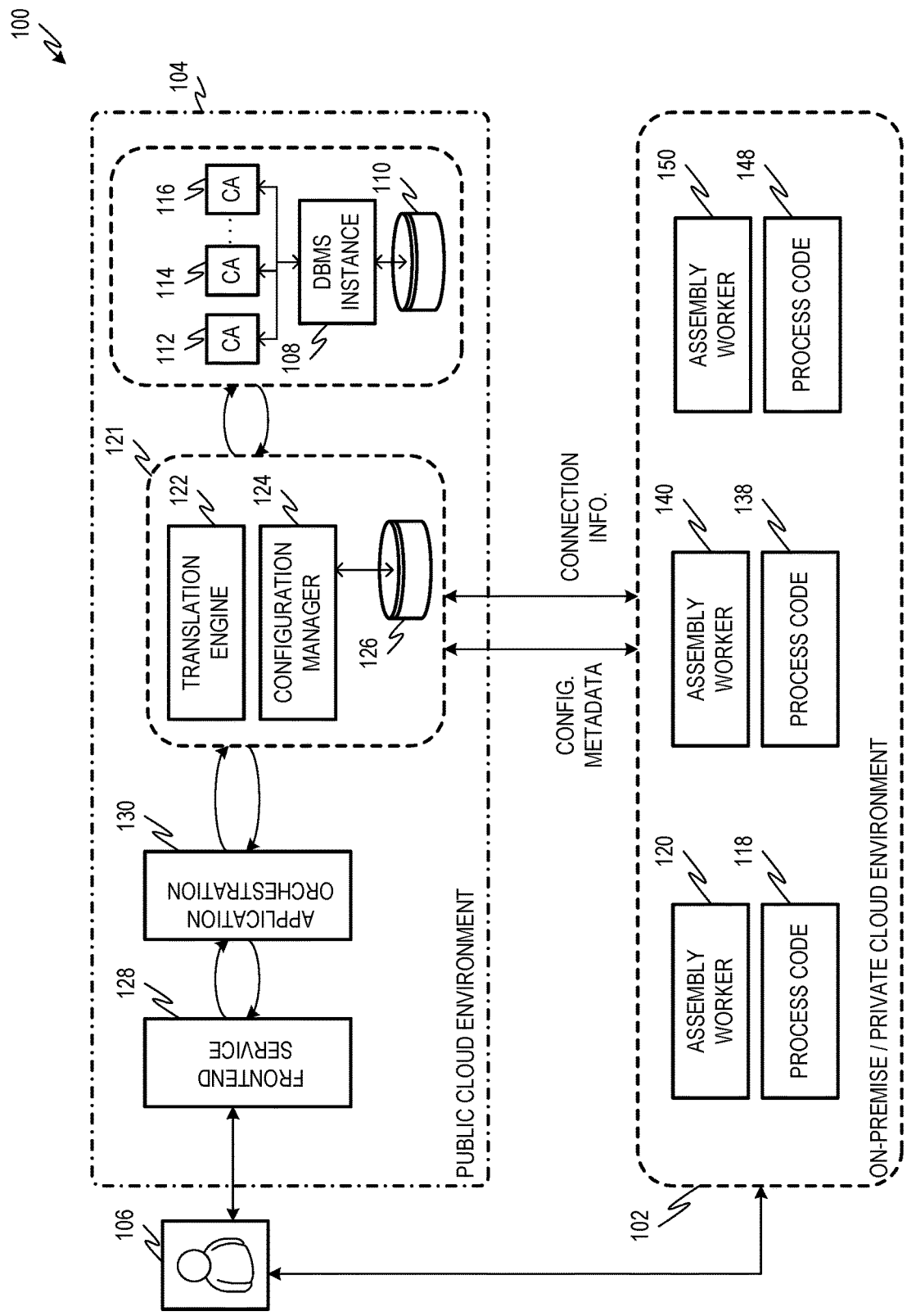
FIG. 1 is a diagram showing one example of an arrangement for migrating legacy process code to a public cloud environment.

Some software solutions are built to include a suite of software applications that execute together. For example, a database management system (DBMS) application may support various client applications. The client applications utilize the DBMS to manage client data. One example of such an arrangement is an Enterprise Resource Planning (ERP) application suite for managing various business processes. The ERP application suite may include various different client applications for managing processes and tasks related to accounting, purchasing, invoicing, shipping, human resources, and/or the like. The client applications utilize the DBMS to store business data to support their processing.

In some arrangements with a DBMS and associated client applications, customer entities generate process code that executes in conjunction with the DBMS. The process code can implement a client application and/or supplement the functionality of a pre-existing client application. Consider an example customer entity that is an energy company using an ERP solution. Energy companies may utilize accounting techniques that are unique to the energy industry. Accordingly, the energy company may generate process code to supplement an accounting client application. The process code, when executed on premises, may access DBMS-managed data supporting the energy-specific accounting technique and also write results of the technique to the DBMS. Consider another example customer entity that is a financial services institution that executes securities trades for customers. Transactions in securities may be governed by particular regulatory rules and may require particular reports to applicable regulatory agencies. The customer man generate process code to implement regulatory requirements and effect required reporting.

In some examples, a software solution including a DBMS and client applications is executed in an on-premises environment. In an on-premises environment, the DBMS application and client applications are executed at a computing system that is built by an enterprise at their own site, referred to as an on-site or on-premises implementation. An on-premises application may be implemented to include a set of one or more executables, libraries, and the like, that are resident at the on-premises computing system. Users associated with the enterprise access the software application from the on-premises computing system.

A similar arrangement can be implemented using a private cloud environment. According to a private cloud environment, an enterprise acquires use of a cloud-based computing system, for example, according to a Platform as a Service (PaaS) arrangement. A private cloud environment may be accessible only to implementing entity and, in some arrangements, may implement a software solution using executables, libraries, and the like that are similar to an on-premises implementation.

In contrast to on-premises or private cloud implementations, some software solutions are executed in a public cloud environment. A public cloud environment includes one or more data centers implementing one or more virtual and/or hardware servers. The public cloud environment may provide access to software solutions according to a Software as a Service (SaaS) model. For example, instances of a cloud-native version of the DBMS and client applications may execute at the public cloud environment. An entity may purchase a tenancy to use the software solution at the public cloud environment. The tenancy entitles one or more user groups from the entity to access an instance of the DBMS and/or other client applications executing at the public cloud environment. A single public cloud environment may provide multiple tenancies supporting multiple user groups that may be from multiple entities.

There are various reasons why it might be desirable for a user group or associated entity to use transition from an on-premises or private-cloud-implemented a software suite to a corresponding public cloud version. For example, a public cloud implementation may require fewer resources and less expense for the entity to maintain. An on-premises implementation may require the entity to maintain an extensive on-premises computing system for executing a DBMS, executing client applications, and implementing database persistencies. Maintaining a private cloud implementation may require less administrative effort than maintaining an on-premises computing system, but there are often still significant efficiencies to be gained by transitioning to a public cloud. Also, because public cloud applications may be characterized by shorter release cycles than on-premises and private cloud applications, meaning that users may enjoy more frequent updates and bug fixes.

Migrating an on-premises or private cloud application suite to a public cloud, however, can present certain difficulties. For example, data managed by the DBMS may need to be migrated to persistencies located at the public cloud, which may often utilize a different schema or other data format.

Migration to a public cloud may generate additional difficulties for software suites in which a customer or other entity has generated extensive process code. Legacy process code developed to execute at an on-premises or private cloud environment may not directly transfer to a public cloud environment due to differences between on-premises applications and public cloud native applications. For example, a cloud native application executing at a public cloud environment may handle communications using a different port mechanism than its corresponding on-premises version. A cloud native application for executing at a public cloud environment may also execute with different dependencies based, for example, on different shared libraries. Also, for example, a cloud native DBMS may utilize a database protocol, such as a Structured Query Language (SQL) protocol that is different than the database protocol used by the corresponding on-premises DBMS.

Because of this lack of compatibility, an entity that has generated extensive process code to supplement an on-premises implementation of a DBMS or other application may be hesitant to upgrade to a public cloud environment. Generating process code for entity-specific processes may take months or, in some examples, years. An entity may not wish to start from scratch to generate cloud-native process code. Also, it may be difficult for an entity to meaningfully evaluate a public cloud DBMS or other applications without the ability to use legacy process code.

Various examples address these and other challenges by providing a process code migration arrangement for a software suite including a DBMS. The process code migration arrangement described herein includes an assembly worker component that executes at the customer entity's on-premises or private cloud computing system along with legacy process code. The arrangement also includes a migration tool comprising a translation component and configuration manager. The migration tool executes at the public cloud along with a DBMS instance associated with the relevant user group.

The assembly worker, executing at the on-premises or private cloud computing system with the legacy process code, generates configuration metadata describing the dependencies and configurations of the legacy process code. The assembly worker, in conjunction with the configuration manager, generates dependency mappings that relate the dependencies of the process code, such as libraries, function calls, etc., to corresponding libraries, resources, and the like at the public cloud environment. The configuration manager may implement a virtual file system. The virtual file system may be implemented in a container at the public cloud and may map configuration files used by the legacy process code to equivalent resources at the public cloud environment. The virtual file system may be used, for example, by the translation engine to translate database protocol messages from the legacy process code, as described herein. In this way, the process code may continue to execute with its previous dependencies, albeit in a manner that can be interpreted and used at the public cloud environment.

The assembly worker also receives database protocol messages, such as SQL messages, directed from the process code to the DBMS. The assembly worker provides the database protocol messages to the translation engine. The translation engine uses the configuration and/or dependency data received from the assembly worker to, if necessary, translate the database protocol messages into a format recognizable by the DBMS instance executing at the public cloud environment. The translated database protocol message is then executed at the DBMS instance. The translation engine returns the result of the database protocol request to the process code executing at the on-premises computing system.

In this way, it may be possible for a user group utilizing an on-premises or private cloud version of a DBMS software solution to perform a migration to a public cloud implementation without the need to immediately re-create legacy process code in a version suitable for execution at the public cloud environment. For example, maintaining an on-premises computing system or private cloud to execute process code only may be significantly less costly than maintaining an on-premises computing system or private cloud to execute the DBMS and its entire application suite. In this way, entities and associated user groups that could benefit from public cloud implementations may be more apt to transition to the public cloud because the transaction costs may be reduced.

FIG. 1 is a diagram showing one example of an arrangement 100 for migrating legacy process code 118 to a public cloud environment 104. The arrangement includes a first environment 102 and the public cloud environment 104. The first environment 102 and public cloud environment 104 implement a suite of applications including a DBMS instance 108 and instances of client application instances 112, 114, 116 for a user group 106. In some examples, the DBMS instance 108 may be an in-memory database such as, for example, the HANA system available from SAP SE of Walldorf, Germany. The DBMS instance 108 and client application instances 112, 114, 116, in some examples, are an example of the S/4 HANA system also available from SAP SE of Walldorf, Germany.

The user group 106 is a group of one or more users who use application instances at the public cloud environment 104 and the process code 118 at the first environment 102. In some examples, the user group 106 is associated with an entity. An entity may be a customer entity that purchases access to the public cloud environment 104 and/or the DBMS instance 108 on behalf of the user group 106. Also, in some examples, the user group 106 may be associated with an internal stakeholder entity associated with the provider of the DBMS instance 108 and/or client application instances 112, 114, 116. An internal stakeholder may be, for example, a development group, a QA and/or testing user group, etc.

The first environment 102 may be or include an on-premises environment and/or a private cloud environment. In examples where the first environment 102 includes an on-premises environment, it may include an on-premises computing system comprising one or more computing devices, such as servers and the like. The on-premises computing system may be maintained by the user group 106 and/or by an entity associated with the user group. In examples in which the first environment 102 includes a private cloud environment, it may include one or more computing devices, such as servers, that are rented by the user group 106 or an associated entity to execute the process code 118, 138, 148. In this example, there are three process codes 118, 138, 148 however, in various examples, there may be more or fewer than three process codes 118, 138, 148 at the environment 102. The first environment 102 may be the same environment that previously executed a legacy on-premises DBMS corresponding to the public cloud DBMS instance 108 or may be a different environment.

The public cloud environment 104 may include one or more computing devices, such as servers, for executing DBMS instances and client applications for user groups, such as the DBMS instance 108 and client application instances 112, 114, 116 for the user group 106. In some examples, the public cloud environment 104 is one of a number of cloud environments implemented by a cloud service provider at different geographic locations. For example, the public cloud environment 104 may be implemented at a data center or data centers geographically near to the user group 106 so as to minimize network latencies as the user group 106 access the public cloud environment 104. Other public cloud environments similar to the public cloud environment 104 may be implemented at data centers geographically near to other user groups to provide instances of the DBMS and/or client applications to those user groups.

The public cloud environment 104 also implements a persistency 110. The persistency 110 may be store data managed by the DBMS instance 108. The persistency 110 may be implemented using any suitable data storage device or devices such as, for example, one or more disks, one or more solid state drives, one or more random access memories, etc.

In some examples, the DBMS instance 108 and client application instances 112, 114, 116 are cloud-native applications coded according to a microservices architecture. In a microservices architecture, the DBMS instance 108 and various client application instances 112, 114, 116 are implemented by a collection of loosely-coupled microservices executing at the public cloud environment 104. Each microservice may also include a single executable that executes in a separate virtual machine (VM) or container implemented by the public cloud environment 104. In a microservice architecture, each microservice is programmed to perform a defined task or small set of tasks and interact with the other microservices in a defined way, for example, according to an application programming interface (API).

In some examples, the DBMS instance 108 and client application instances 112, 114, 116 include a set of one or more executables, libraries, and/or other components executed within a single container or a limited set of containers implemented at the public cloud environment 104. For example, the DBMS instance 108 and/or client application instances 112, 114, 116 may be instances of legacy on-premises applications executing within the cloud-implemented containers.

The public cloud environment 104 also executes one or more services 128, 130 for managing the execution of the DBMS instance 108 and client application instances 112, 114, 116. The services 128, 130 may execute at the public cloud environment 104 in one or more containers. A frontend service 128 may interface with the user group 106. For example, the frontend service 128 may provide users from the user group 106 with a user interface to allow the users to access the DBMS instance 108 and client application instances 112, 114, 116 that are executing and/or to launch new application instances.

Application orchestration service 130 may manage the execution of the DBMS instance 108 and/or client application instances 112, 114, 116. For example, the application orchestration service 130 may manage the execution of one or more containers including the DBMS instance 108 or client application instances 112, 114, 116. The application orchestration service 130 may begin the execution of one or more container images to implement the DBMS instance 108 and/or client application instances 112, 114, 116. Also, if one or more of the containers crash, the application orchestration service may also spin up a replacement for the crashed container or containers.

In the example of FIG. 1, the public cloud environment 104 also includes process code migration tools 121 including a translation engine 122, a configuration manager 124, and a configuration repository 126. The configuration repository 126, is, in some examples, managed by an additional DBMS instances (not shown) executed at the public cloud environment.

The process code migration tools 121 are in communication with the legacy process code 118, 138, 148 executing at the first environment 102 via assembly workers 120, 140, 150, which may also execute at the first environment 102. In this example, each instance of process code 118, 138, 148 has an assigned assembly worker 120, 140, 150. In other examples, however, a single assembly worker 120, 140, 150 may be configured to manage more than one instance of process code 118, 138, 148.

In the arrangement of FIG. 1 where the process code 118, 138, 148 and assembly workers 120, 140, 150 execute at the first environment 102, the entity associated with the user group 106 may execute the process code 118, 138, 148 and assembly workers 120, 140, 150, for example, at the same environment that executed the legacy DBMS instance and suite of client applications prior to the migration. It will be appreciated that, in some examples, instead of being executed at a different environment 102, the process code 118, 138, 148 and assembly worker 120, 140, 150 may be executed within one or more containers implemented at the public cloud environment 104.

The assembly workers 120, 140, 150 and migration tools 121 are configured to permit the legacy process code 118, 138, 148 to execute as it would have in conjunction with the legacy DBMS instance and client applications while communicating with the public cloud DBMS instance 108 and client application instances 112, 114, 116. This may involve several modifications and/or translations.

The process code 118, 138, 148, in some examples, is coded to a set of configuration dependencies that are specific to the execution environment of the legacy on-premises DBMS with which it was designed to operate. For example, the process code 118, 138, 148 may be written in various different languages such as, for example, Java, Python, C++ and the like and may use various libraries, such as Java libraries, Python libraries, C++ libraries and/or the like. The process code 118, 138, 148 may include calls to various functions set forth in libraries associated with the relevant programming language or with other environment-specific factors. These specific functions may not be available in the public cloud environment 104 and/or may operate according to a different syntax or format.

Also, the process code 118, 138, 148 may be written to utilize DBMS functionality based on template DBMS libraries provided by the legacy DBMS instance. The public cloud-implemented DBMS instance 108 may have similar functionalities, but may expose its functionalities in different forms, such as in different libraries and/or using different function calls. Accordingly, references to DBMS-provided libraries made by the process code 118, 138, 148 based on a legacy on-premises or private cloud environment may not directly transfer to the corresponding DBMS-provided libraries used by the DBMS instance 108 executing at the public cloud environment. In this way, the dependencies of the process code 118, 138, 148 also include DBMS libraries that are used to access functionalities provided by the DBMS.

In some examples, there are also differences between the database protocols used at a legacy on-premises or private cloud environment versus the public cloud environment 104. For example, database messages generated by the process code 118, 138, 148 may reference a legacy on-premises and/or private cloud data repository according to the data structures and schemas that were used at the legacy on-premises and/or private cloud versions of the DBMS instance 108 and/or client application instances 112, 114, 116. The public-cloud-implemented DBMS instance 108 and client application instances 112, 114, 116, however, may use a different database protocol that references the persistency 110 used by the DBMS instance 108. While some of the database protocol messages under the database protocol of the legacy DBMS instance may directly transfer to the database protocol of the DBMS instance 108, others may not. For example, the DBMS instance 108 at the public cloud environment 104 may use a different port mechanism to facilitate communications with the DBMS instance 108 and client application instances 112, 114, 116 than what is used by the legacy process code 118, 138, 148.

The migration tools 121 and assembly workers 120, 140, 150 may provide an interface between the process code 118, 138, 148 and the DBMS instance 108 and client application instances 112, 114, 116 executed at the public cloud environment 104. The assembly workers 120, 140, 150 may generate configuration metadata and connection data from the process code 118 and provide the configuration information and connection data to the migration tools 121. The assembly workers 120, 140, 150, in conjunction with the configuration manager 124, may also generate assembly objects. The assembly objects may include DBMS libraries and/or other configuration files that are mapped from the legacy form executed by the legacy process code 118, 138, 140 to the form used by the public cloud environment 104. In this way, the legacy process code 118, 138, 148 may execute in a manner that is compatible with the public-cloud-implemented DBMS instance 108 and client application instances 112, 114, 116.

The assembly workers 120, 140, 150 may generate and exchange configuration metadata with the migration tool 121. The configuration metadata may include data describing dependencies of the process code 118, 138, 148. For example, the dependencies of the process code 118, 138, 148 may include dependencies on libraries associated with the legacy on-premises or private cloud environment for which the process code 118, 138, 140 was created. Dependencies determined by the assembly workers 120, 140, 150 may also include dependencies based on DBMS libraries or functionality.

In some examples, generating the dependencies involves an exchange of configuration metadata between the assembly workers 120, 140, 150 and the migration tool 121. For example, the assembly workers 120, 140, 150 may be configured to determine dependencies of the process code 118, 138, 148 and may receive configuration metadata from the migration tool 121 to correlate the dependencies of the process code 118, 138, 148 to corresponding compatible dependencies at the public cloud environment 104.

Consider an example, in which the process code 118 is coded in Python. The assembly workers 120, 140, 150 may determine that the process code 118 has a dependency on a first Python library. Configuration metadata received from the migration tool 121 (e.g., the configuration manager 124 thereof) may indicate one or more libraries and/or associated function calls that are available at the public cloud environment 104 to provide functionality similar to that of the first Python library. Consider another example in which the assembly worker 140 determines that the process code 138 has a dependency that uses a DBMS library to access functionality of the legacy on-premises or private cloud DBMS. The assembly worker 120 may receive configuration metadata indicating the corresponding DBMS library used by the DBMS instance 108 at the public cloud environment 104.

The configuration manager 124 may utilize configuration metadata received from the assembly workers 120, 140, 150, including the determined dependencies of the process code 118, 138, 148, to generate assembly objects, described in more detail hereon. The assembly objects may relate calls from the process code 118, 138, 148 to corresponding libraries supported by the public cloud DBMS instance 108. In this way, during runtime, the process code 118, 138, 148 may use the assembly objects to interface with the public cloud environment 104.

In some examples, the configuration manager 124 implements a configuration indicator array. The configuration indicator array may be implemented at the public cloud environment 104 and may map dependencies of the process code 118, 138, 148 to corresponding libraries, function calls, or other functionality at the public cloud environment 104. For example, the configuration indicator array may map a configuration file, such as a library, utilized by the process code 118, 138, 148 to a corresponding resource at the public cloud environment 104 such as, for example, a corresponding library, a microservice, and/or the like. In this way, when the process code 118, 138, 148 sends database protocol messages and other messages to the public cloud environment 104, the configuration indicator array may be used to relate dependencies reflected by the incoming message to the public cloud environment 104. The configuration manager 124 may store configuration metadata, configuration indicator arrays or other dependency mappings, and the like at a configuration repository 126. In some examples, the configuration repository 126 is or is managed by another DBMS instance executed at the public cloud environment 104.

Assembly workers 120, 140, 150 may also provide connection information, which relates to messages, such as database protocol messages, generated by the process code 118. Database protocol messages are messages generated by the process code 118, 138, 148 to query the DBMS instance 108 and/or otherwise access functionality of the DBMS instance 108. The assembly workers 120, 140, 150 provide database protocol messages generated by the process code 118, 138, 148 to the migration tool 121 (e.g., the translation engine 122 thereof). In some examples, the assembly workers 120, 140, 150 also provide port mechanism data describing the port mechanism used by the process code 118, 138, 140. Connection information may include the database protocol messages and the other metadata about the messages, such as the port mechanism data. The migration tool 121 (e.g., the translation engine 122) may translate the database protocol messages to a format used by the DBMS instance 108 and provide those message to the DBMS instance 108 for execution. The migration tool 121 (e.g., the translation engine 122) may provide responses from the DBMS instance 108 to the process code 118, 138, 148, for example, via the assembly workers 120, 140, 150. In this way, the process code 118, 138, 148 that may have been coded for a legacy on-premises or private cloud environment may communicate seamlessly the public cloud DBMS instance 108 and/or client application instances 112, 114, 116.

Figure 2:
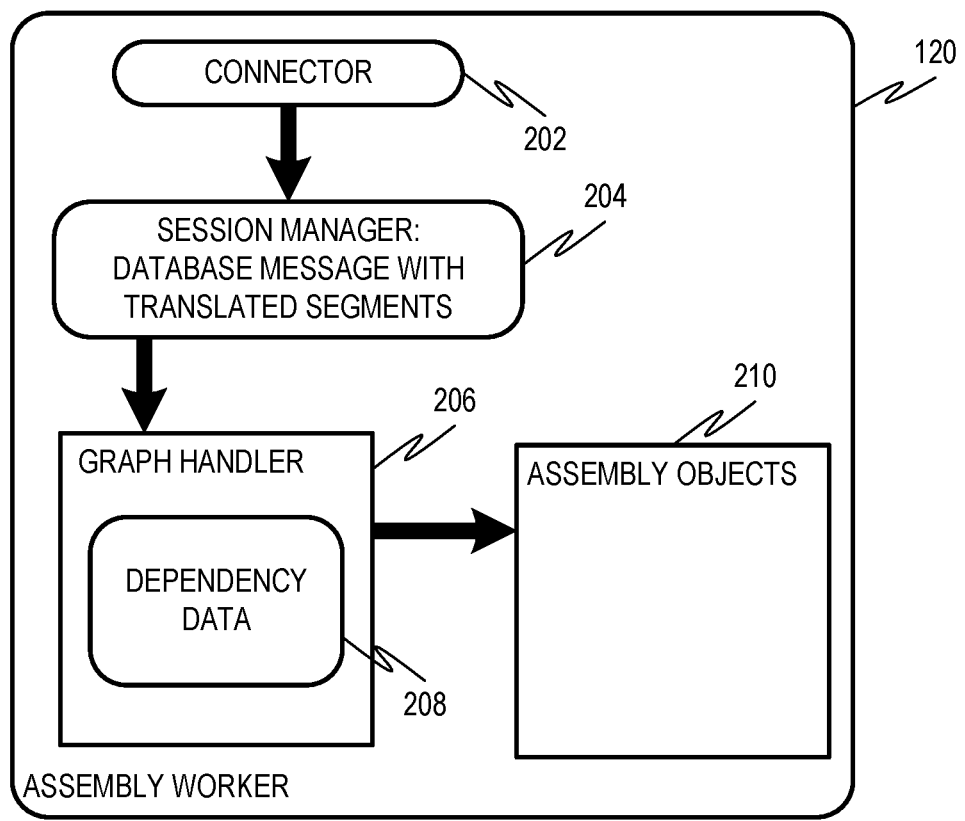
FIG. 2 is a diagram showing the assembly worker of FIG. 1 including additional details.

FIG. 2 is a diagram showing the assembly worker 120 of FIG. 1 including additional details. FIG. 2 shows the assembly worker 120, however, it will be appreciated that the assembly workers 120, 140, 150 may be arranged and operate in a similar manner.

The assembly worker 120 generates a dependency data 208 describing dependencies of the process code 118. This can include environment-specific dependencies, such as dependencies on a programming language library and/or dependencies based on DBMS-provided libraries. To generate the dependency data 208, the assembly worker 120 may examine the process code 118 to determine libraries used by the process code 118. Process code 118 may utilize a number of libraries. Example libraries may include *.so files in a Linux arrangement, *.dll or *.exe files in a Microsoft Windows arrangement, or similar libraries in different arrangements. The libraries used by the process code 118 may include libraries that are commonly used, for example, in the language in which the process code 118 was created as well as libraries provided as part of a template associated with the legacy DBMS for which the process code 118 was coded, or associated client applications. For example, the legacy DBMS may utilize a particular access control technique, data integration technique, or other similar techniques defined by a library or libraries. The access control, data integration, or other technique may be described by a library or libraries that are invoked by the process code 118.

The assembly worker 120 may generate dependency data by examining and recording the libraries invoked by the process code 118. The dependency data may be provided to the migration tool 121 as configuration metadata. The assembly worker 120 may comprise a graph handler 206 that generates the dependency data 208. The dependency data 208 may take different forms, for example, based on the volume of concurrent requests coming to the assembly worker 120. For example, if the number of concurrent requests is low, the assembly worker 120 may provide the dependency data 208 as a list. In some examples, if the number of concurrent requests is high, the assembly worker 120 may arrange the dependency data into a dependency graph. In the dependency graph, the dependencies may be arranged in a manner to facilitate faster searching and location of dependencies indicated by the dependency data 208.

The graph handler 206 may further generate assembly objects 210. Assembly objects may map the legacy on-premises and/or private cloud environment for which the process code 118 was coded to the public cloud environment 104. For example, the assembly objects 210 may include and/or be based on the dependency data 208 referenced libraries, as described herein. In some examples, the assembly objects 210 include a mapping between the libraries forming the basis of the dependencies of the process code 218 and corresponding libraries used at the public cloud environment. For example, the assembly worker 120 may provide the dependency data 208 and/or associated data to the migration tool 121 (e.g., configuration manager 124 thereof), which may return indicates of libraries or other dependencies used at the public cloud environment 104 that correspond to the dependencies indicated by the dependency graph. The assembly worker 120 (e.g., graph handler 206 thereof), uses this data to generate the mappings of the assembly objects 210.

In some examples, some or all of the assembly object is generated at the migration tool 121 (e.g., the configuration manager 124). As described in more detail herein, the assembly worker 120 may provide the configuration manager with configuration metadata including the dependency data 208 (e.g., a dependency graph and/or dependency list). In some examples, the assembly worker 120 may provide one or more libraries from the environment 102 to the configuration manager 124. For example, if the process code 118 uses a library native to the legacy on-premises or private cloud environment, the configuration manager 124 may provide that library to the configuration manager 124. The configuration manager 124 may utilize the library or libraries to generate mappings that may be used in the assembly object and/or used to implement the configuration indicator array or other dependency mappings at the configuration manager 124, as described herein.

The assembly worker 120 may also generate connection information about the process code 118. The connection information may include, for example, an indication of the port mechanism used by the process code 118 to access the legacy DBMS. In other examples, the connection information includes other metadata about the process code 118, 138, 140 including, for example, an authorization mechanism used, etc. Connection information may also include database protocol messages themselves and replies thereto.

The assembly worker 120 may also comprise a session manager 204 and connector 202 for handling database protocol messages, such as SQL messages, generated by the process code. As described herein, the process code 118 may be configured to query or otherwise access the functionality of a legacy on-premises or private cloud DBMS. The process code 118 may direct such database protocol messages to the DBMS instance that it expects to be executing at the first environment 102. The assembly worker 120 (e.g., the session manager 204 thereof) intercepts the database protocol messages sent by the process code 118 and directs them to the migration tool 121 (e.g., the translation engine 122 thereof). In some examples, the assembly worker 120 also captures and/or tracks state data describing a state of the database protocol message. The assembly worker 120 may store the state data and/or provide the state data to the translation engine 122. State data may include, for example, local or private cloud configuration adaption data, local or private cloud run-time self-define memory data structures, assembly worker execution data snapshot for recover purposes, and the like.

Upon receiving a database protocol message generated by the process code 118, the translation engine 122 translates the message to a format suitable for the DBMS instance 108 and provides the translated database protocol message to the DBMS instance 108. The translation engine 122 may utilize the configuration metadata to perform the translation. In some examples, the translation engine 122 utilizes a configuration indicator array or other dependency mappings generated by and/or stored at the configuration manager 124 (e.g., the configuration repository 126 thereof). The translation engine 122 may receive a reply from the DBMS instance 108 and translate the reply to a protocol format recognizable by the process code 118. When state data is provided to the translation engine 122, it may consider the state data when translating the reply message.

The assembly worker 120 may receive the translated reply and provide it to the process code 118. In some examples, the assembly worker 120 comprises a connector 202 that manages communications between the assembly worker 120 and the migration tool 121. In examples in which the assembly worker 120 manages state data for database protocol messages between the process code 118 and DBMS instance 108, a session manager 204 may store the state data for outgoing messages and modify incoming reply messages using the stored state data to maintain the stateful nature of the communications. Modifying the reply message may include incorporating the stored state data into the received reply message before the reply message is provided to the process code 118.

Figure 3:
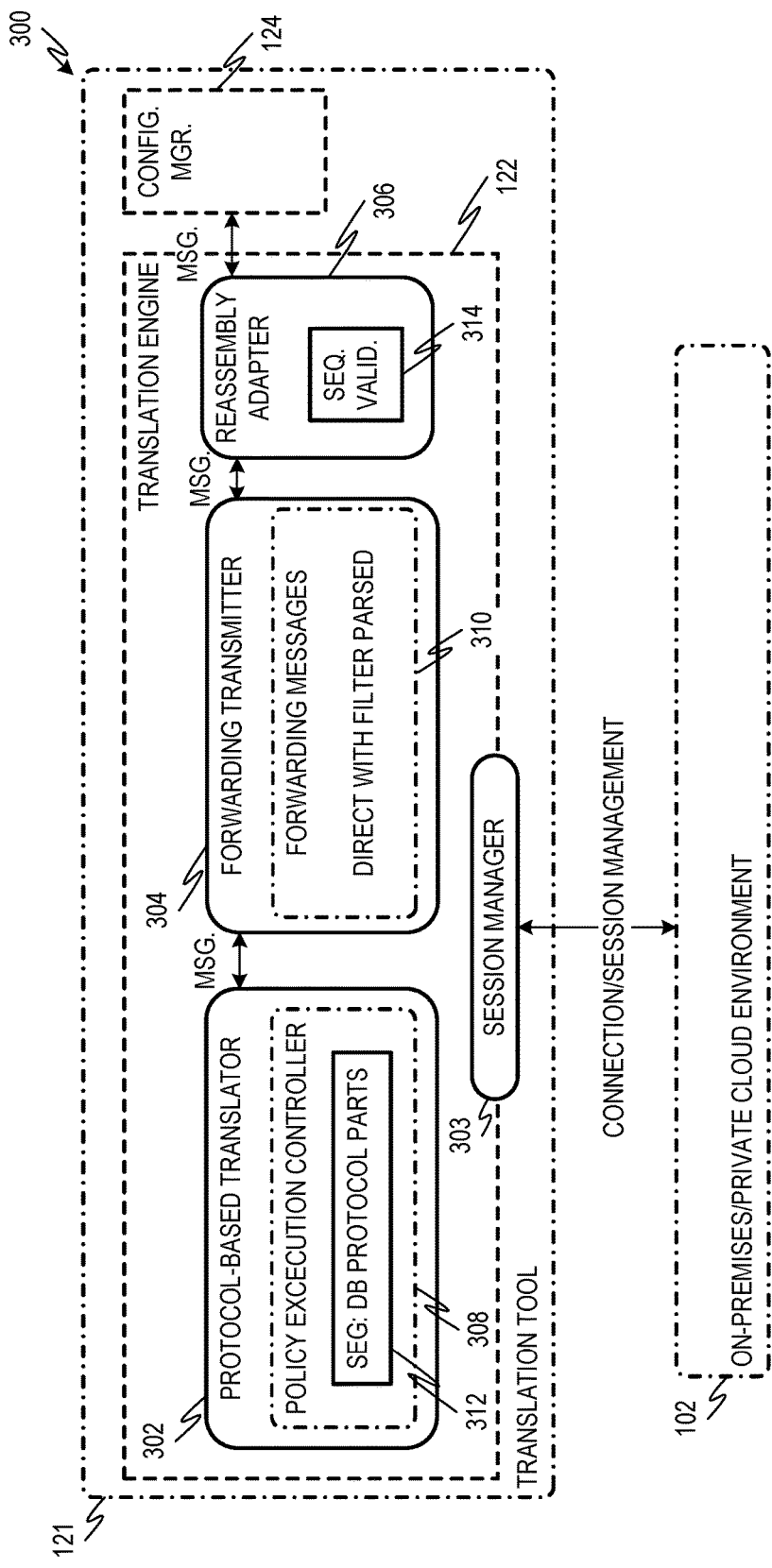
FIG. 3 is a diagram showing the migration tool in communication with the environment of FIG. 1 to illustrate additional details of the translation engine.

FIG. 3 is a diagram 300 showing the migration tool 121 in communication with the environment 102 to illustrate additional details of the translation engine 122. The translation engine 122 comprises a session manager 303. The session manager 303 manages database protocol messages sent between the translation engine 122 and the various assembly workers 120, 140, 150 at the environment 102. In examples where the assembly workers 120, 140, 150 also provide state data with database protocol messages, the session manager 303 may manage the state data.

The session manager 303, or other suitable component of the translation engine 122, upon receiving a process code-generated database protocol message from an assembly worker 120, 140, 150, may apply a filter to determine whether the incoming database protocol messages can be forwarded directly to the DBMS instance 108 or whether the incoming database protocol messages should be first translated between the database protocol used by the legacy process code 118, 138, 148 and that used by the DBMS instance 108. For example, in some cases some database protocol messages may conform to both the legacy database protocol used by the process code 118, 138, 148 and the database protocol used by the public cloud-implemented DBMS instance 108. Database protocol messages that do not require translation may be provided to the forwarding transmitter 304 for transmission to the DBMS instance 108, as described herein.

Consider the following example. The process code 118, 138, 148 may be configured to generate database protocol messages based on legacy data compliance scenarios and customer scenarios suitable for the legacy on-premises and/or private cloud-implemented DBMS for which the process code 118, 138, 148 was originally coded. Accordingly, the process code 118, 138, 148 may generate database protocol messages that are compliant with the legacy data compliance scenarios and customer scenarios. The DBMS instance 108 implemented at the public cloud environment 104 may operate according to public cloud-specific data compliance and customer scenarios. The legacy data compliance scenarios and customer scenarios are not identical to the public cloud data compliance and customer scenarios but may overlap such that some database protocol messages generated by the process code 118, 138, 148 according to the legacy data compliance scenarios and customer scenarios may comply with the public cloud data compliance and customer scenarios while others may not. Accordingly, the message filter may detect database protocol messages from the process code 118, 138, 148 that comply with the public cloud data compliance and customer scenarios. For example, an SQL database protocol message may specify data from an on-premise or private cloud location. The message filter may translate the message into a format including the proper reference to the data at the public cloud environment 104.

Database protocol messages that are to be translated may be provided to the protocol-based translator 302. The protocol-based translator 302 implements a policy-execution controller 308 that decomposes a database protocol message into segments, resulting in segmented database protocol parts 312. The segmented database protocol parts 312 are reconstructed according to the protocol syntax used by the DBMS instance 108 and provided to the forwarding transmitter 304.

The forwarding transmitter 304, then, may comprise forwarding messages 310 that are to be forwarded to the DBMS instance 108. The forwarding messages 310 at the forwarding transmitter 304 may include some messages that were translated by the protocol-based translator 302 and other messages that were compliant with the database protocol of the DBMS instance 108 and were therefore suitable for direct transmission, as described herein.

A reassembly adapter 306 may execute a sequence validation checker 314 to verify the forwarding messages 310 before the messages 310 are provided to the DBMS instance 108. For example, the public cloud DBMS instance 108 may have policies, such as security and compliance policies, that are different than the legacy on-premises or private cloud DBMS that the process code 118, 138, 148 was configured to work with.

For example, if the user group 106 were to generate cloud-native process code to be executed with the DBMS instance 108 at the public cloud environment 104, that cloud-native process code would be checked against one or more security and/or compliance policies of the public cloud environment 104 before the cloud-native process code was entered into an application programming interface (API) gateway to be loaded and executed at the public cloud environment 104. In this example, however, the process code 118, 138, 148 was generated for a legacy on-premises or private cloud example of the DBMS and is executed at the environment 102. Accordingly, the database protocol messages generated by the process code 118, 138, 148 may not comply with the security and/or compliance policies of the public cloud environment 104.

In some examples, the reassembly adapter 306 or other suitable component of the translation engine 122 may utilize the configuration manager 124 and/or the configuration indicator array as part of the message translation protocol. For example, in addition to being constructed according a different database protocol, database protocol messages generated by the process code 118, 138, 148 may include references to libraries or other dependent resources that may not exist at the public cloud environment 104. For example, configuration data from the process code 118, 138, 148 may be needed during database protocol message execution to properly render an intermediate or temporary result of the database protocol message that is used or linked in later execution stages. Also, in some examples, executing database protocol messages from the process code 118, 138, 148 may include pre-execution and/or post-execution actions that use the process code 118, 138, 148. Accordingly, the reassembly adapter 306 or other suitable component of the translation engine 122 may configuration metadata and/or generated mappings at the configuration manager 124 and utilize the configuration indicator array or other suitable dependency mappings during translation and/or other processing of database protocol messages.

The reassembly adapter 306 may modify the forwarding messages 310 and/or modify the sequence of the forwarding messages 310 to make them meet with the security and/or compliance policies of the public cloud environment 104. In some examples, this includes changing the sequence of the forwarding messages 310. Also, in some examples, modifying the forwarding messages to make them meet the security and compliance policies of the public cloud environment 104 may include adding elements to one or more of the messages, such as tags or other notations called for by the security and/or compliance policies of the public cloud environment 104.

Consider an example database protocol message that includes references to the location of data at the on-premises or private cloud environment 102. These references may not be compliant at the public cloud environment 104. For example, the data referred to may be stored at a different location at the cloud environment 104. Accordingly, the database protocol message may be modified to refer to the proper location of the data at the public cloud environment 104.

When the forwarding messages 310 are translated (if needed) and compliant with the public cloud security and/or compliance policies, the forwarding transmitter 304 may provide the forwarding messages to the DBMS instance 108 for execution. The forwarding transmitter 304 may also store stateful information about one or more of the forwarding messages. The DBMS instance 108 executes the forwarding messages and provides reply messages to the forwarding transmitter 304. The forwarding transmitter 304 may modify the reply messages in view of the stateful information and provide modified reply messages to the assembly workers 120, 140, 150 and/or process code 118, 138, 148 at the environment 102. Generating the modified reply messages may include incorporating stored state data into the reply messages before the reply messages are provided to the process code 118, 138, 148.

For example, a database protocol message may include and/or refer to one or more internal and intermediate variable values that control an iterative value. The internal and/or intermediate variable values may be stateful information stored and then re-added to reply messages. Another example of stateful data includes SQL view managing values and similar values that are to cause the overall SQL messages and procedures run with integrity and completeness.

Figure 4:
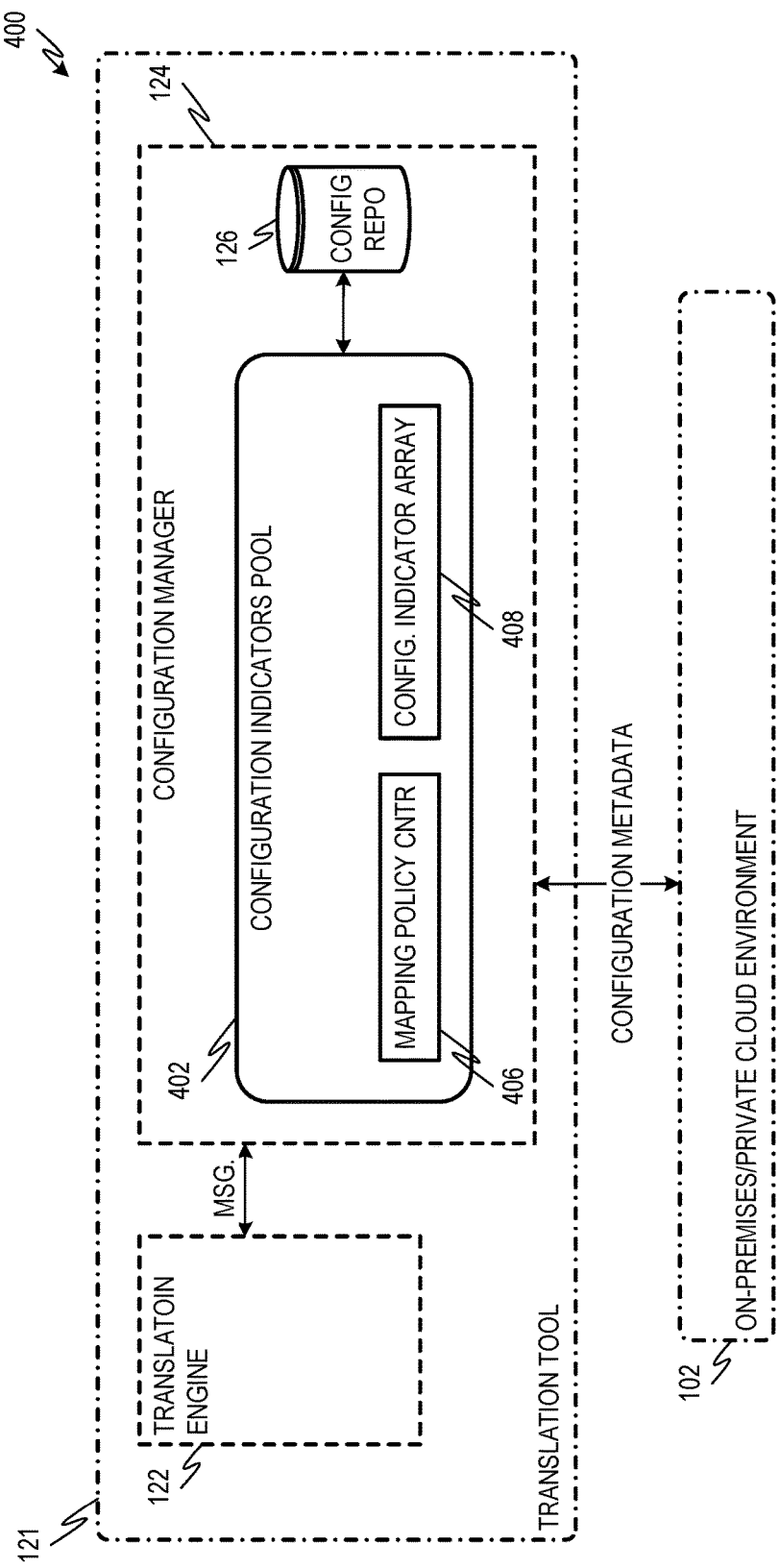
FIG. 4 is a diagram showing the migration tool in communication with the environment of FIG. 1 to illustrate additional example details of the configuration manager.

FIG. 4 is a diagram 400 showing the migration tool 121 in communication with the environment 102 to illustrate additional example details of the configuration manager 124. In this example, the configuration manager 124 comprises a policy execution controller 402 including a mapping policy center 406 and a configuration indicator array 408. The mapping policy center 406 is configured to perform metadata analysis on configuration metadata received from the assembly workers 120, 140, 150 and describing dependencies of the process code 118, 138, 148. For example, the mapping policy center 406 may generate the configuration indicator array 408. The mapping policy center 406 or other suitable component may store received configuration metadata, including configuration files from the process code 118, 138, 148, at the configuration repository 126.

The configuration indicator array 408, as described herein, may comprise a dependency mapping linking configuration files of the process code 118, 138, 148, such as libraries, to corresponding resources at the public cloud environment 104, such as libraries, microservices, etc. In some examples, the configuration indicator array 408 is implemented using one or more containers including virtual file systems that map configuration files of one or more of the process codes 118, 138, 148 to equivalent resources at the public cloud environment 104.

In some examples, the process code 118, 138, 148 utilizes the configuration indicator array during setup, execution, and/or post-execute to remotely consume the services provided by the DBMS instance 108 and/or client application instances 112, 114, 116. For example, the configuration indicator array 408 main include a mapping between the location or suitable call for a DBMS and/or client application functionality at the legacy on premises implementation and a corresponding functionality of the DBMS instance 108 and/or client application instances 112, 114, 116 at the public cloud environment 104. The process code 118, 138, 148 (via the assembly workers 120, 140, 150) may use the configuration indicator array 408 to call equivalent functionality at the public cloud environment 104. For example, the respective assembly workers 120, 140, 150 may act as an intermediary agent may intercept function calls from the process code 118, 138, 148 and use the configuration indicator array 408 to convert the same to calls to equivalent functions at the public cloud environment 104.

The configuration manager 124, in some examples, provides configuration mapping and storage reallocation. The configuration manager collects the configuration files associated with the DBMS instance 108 and/or client application instances 112, 114, 116 and maps those configuration files to the dependencies of the process code 118, 138, 148 indicated by the configuration metadata, resulting in the configuration indicator array 408. The configuration indicators array 408 (or portions thereof) may be provided to each assembly worker 120, 140, 150 and its associated process code 118, 138, 148 to generate local configuration environment.

Figure 5:
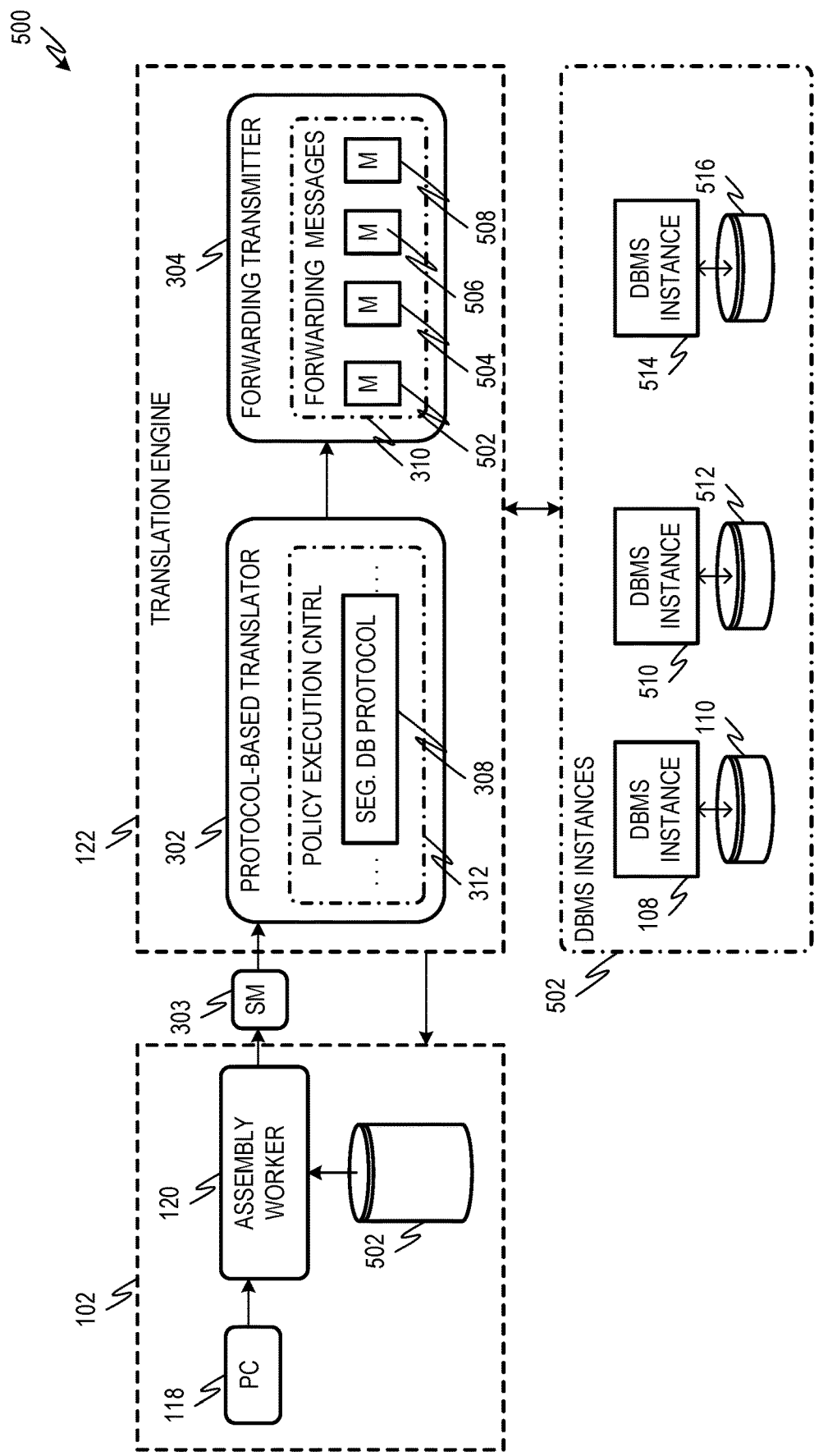
FIG. 5 is a diagram showing one example workflow demonstrating the operation of process code.

FIG. 5 is a diagram showing one example workflow demonstrating the operation of process code 118. The example of FIG. 5 shows process code 118 and assembly worker 120 at the environment 102, although it will be appreciated that process code 138, 148 and assembly workers 120, 140, 150 may operate in a similar manner. In this example, the assembly worker 120 utilizes a local storage 502 at the environment 102. The assembly worker may store configuration metadata, configuration files, the assembly objects 210, or any other suitable data at the local storage 502.

The process code 118 may generate one or more database protocol message directed towards the DBMS instance 108 and/or another DBMS instance 510, 514 executing at the public cloud environment 104. For example, the database protocol message may request data stored at one or more of the persistencies 110, 512, 516 managed by the respective DBMS instances 108, 510, 514.

The database protocol message may be intercepted by the assembly worker 120, which may provide the database protocol message to the session manager 303 of the translation engine 122. At the translation engine 122, the forwarding transmitter 304 may apply a filter or switch to determine whether the database protocol message requires translating before being provided to one or more of the DBMS instances 108, 510, 514. If translation is desirable, the translation may be performed by the protocol-based translator 302, as described herein. FIG. 5 shows messages 502, 504, 506, 608 at forwarding messages 310. For example, the translation engine 122 may perform sequence validation or other suitable policy validation of the messages 502, 504, 506, 508. When validation has occurred, the messages 502, 504, 506, 508 may be provided to the appropriate DMBS instances 108, 510, 514, as described herein.

In view of the disclosure above, various examples are set forth below. It should be noted that one or more features of an example, taken in isolation or combination, should be considered within the disclosure of this application.

EXAMPLES

Example 1 is a system for operating a database management system (DBMS) in a cloud environment, the system comprising: at least one processor programmed to perform operations comprising: receiving, from an assembly worker executing at a first computing device, a first database protocol message generated by a process code executing at the first computing device; translating, by a translation engine executing at the cloud environment, the first database protocol message from a first format to a second format associated with a DBMS instance executing at the cloud environment to generate a translated first database protocol message; causing, by the translation engine, the translated first database protocol message to be provided to the DBMS instance; receiving, from the DBMS instance, a first reply corresponding to the translated first database protocol message; and sending the first reply to the process code.

In Example 2, the subject matter of Example 1 optionally includes the operations further comprising: receiving, from the assembly worker, a second database protocol message generated by the process code; determining, by the translation engine, that the second database protocol message is compatible with the second format; and causing, by the translation engine, the second database protocol message to be provided to the DBMS instance.

In Example 3, the subject matter of Example 2 optionally includes the operations further comprising validating a sequence of the first database protocol message and the second database protocol message before causing the translated first database protocol message to be provided to the DBMS instance and before causing the second database protocol message to be provided to the DBMS instance.

In Example 4, the subject matter of any one or more of Examples 1-3 optionally includes the operations further comprising: decomposing, by the translation engine, the first database protocol message to generate a plurality of message segments; and reconstructing the plurality of message segments to generate the translated first database protocol message.

In Example 5, the subject matter of any one or more of Examples 1-4 optionally includes the first database protocol message comprising state data, the system the operations further comprising: storing the state data, by the translation engine; and incorporating, by the translation engine, the state data into the first reply before the first reply is sent to the process code.

In Example 6, the subject matter of any one or more of Examples 1-5 optionally includes the operations further comprising: receiving, by a configuration manager executing at the cloud environment, configuration metadata from the assembly worker, the configuration metadata describing at least one configuration file used by the process code; and generating a mapping between the at least one configuration file used by the process code and at least one corresponding resource at the cloud environment.

In Example 7, the subject matter of Example 6 optionally includes the first database protocol message comprising a reference to a first configuration file, the operations further comprising using the mapping between the at least one configuration file used by the process code and at least one corresponding resource at the cloud environment to modify the first database protocol message to refer to a resource at the cloud environment corresponding to the first configuration file.

In Example 8, the subject matter of any one or more of Examples 1-7 optionally includes wherein translating the first database protocol message from the first format to the second format comprises modifying the first database protocol message to replace a reference to a first port to a reference to a corresponding port.

Example 9 is a method for operating a database management system (DBMS) in a cloud environment, the method comprising: receiving, from an assembly worker executing at a first computing device, a first database protocol message generated by a process code executing at the first computing device; translating, by a translation engine executing at the cloud environment, the first database protocol message from a first format to a second format associated with a DBMS instance executing at the cloud environment to generate a translated first database protocol message; causing, by the translation engine, the translated first database protocol message to be provided to the DBMS instance; receiving, from the DBMS instance, a first reply corresponding to the translated first database protocol message; and sending the first reply to the process code.

In Example 10, the subject matter of Example 9 optionally includes receiving, from the assembly worker, a second database protocol message generated by the process code; determining, by the translation engine, that the second database protocol message is compatible with the second format; and causing, by the translation engine, the second database protocol message to be provided to the DBMS instance.

In Example 11, the subject matter of Example 10 optionally includes validating a sequence of the first database protocol message and the second database protocol message before causing the translated first database protocol message to be provided to the DBMS instance and before causing the second database protocol message to be provided to the DBMS instance.

In Example 12, the subject matter of any one or more of Examples 9-11 optionally includes decomposing, by the translation engine, the first database protocol message to generate a plurality of message segments; and reconstructing the plurality of message segments to generate the translated first database protocol message.

In Example 13, the subject matter of any one or more of Examples 9-12 optionally includes the first database protocol message comprising state data, the method further comprising: storing the state data, by the translation engine; and incorporating, by the translation engine, the state data into the first reply before the first reply is sent to the process code.

In Example 14, the subject matter of any one or more of Examples 9-13 optionally includes receiving, by a configuration manager executing at the cloud environment, configuration metadata from the assembly worker, the configuration metadata describing at least one configuration file used by the process code; and generating a mapping between the at least one configuration file used by the process code and at least one corresponding resource at the cloud environment.

In Example 15, the subject matter of Example 14 optionally includes the first database protocol message comprising a reference to a first configuration file, the method further comprising using the mapping between the at least one configuration file used by the process code and at least one corresponding resource at the cloud environment to modify the first database protocol message to refer to a resource at the cloud environment corresponding to the first configuration file.

In Example 16, the subject matter of any one or more of Examples 9-15 optionally includes wherein translating the first database protocol message from the first format to the second format comprises modifying the first database protocol message to replace a reference to a first port to a reference to a corresponding port.

Example 17 is a non-transitory machine-readable medium comprising instructions thereon that, when executed by at least one processor in a cloud environment, cause at least one processor at the cloud environment to perform operations comprising: receiving, from an assembly worker executing at a first computing device, a first database protocol message generated by a process code executing at the first computing device; translating, by a translation engine executing at the cloud environment, the first database protocol message from a first format to a second format associated with a database management system (DBMS) instance executing at the cloud environment to generate a translated first database protocol message; causing, by the translation engine, the translated first database protocol message to be provided to the DBMS instance; receiving, from the DBMS instance, a first reply corresponding to the translated first database protocol message; and sending the first reply to the process code.

In Example 18, the subject matter of Example 17 optionally includes the operations further comprising: receiving, from the assembly worker, a second database protocol message generated by the process code; determining, by the translation engine, that the second database protocol message is compatible with the second format; and causing, by the translation engine, the second database protocol message to be provided to the DBMS instance.

In Example 19, the subject matter of Example 18 optionally includes the operations further comprising validating a sequence of the first database protocol message and the second database protocol message before causing the translated first database protocol message to be provided to the DBMS instance and before causing the second database protocol message to be provided to the DBMS instance.

In Example 20, the subject matter of any one or more of Examples 17-19 optionally includes the operations further comprising: decomposing, by the translation engine, the first database protocol message to generate a plurality of message segments; and reconstructing the plurality of message segments to generate the translated first database protocol message.

Figure 6:
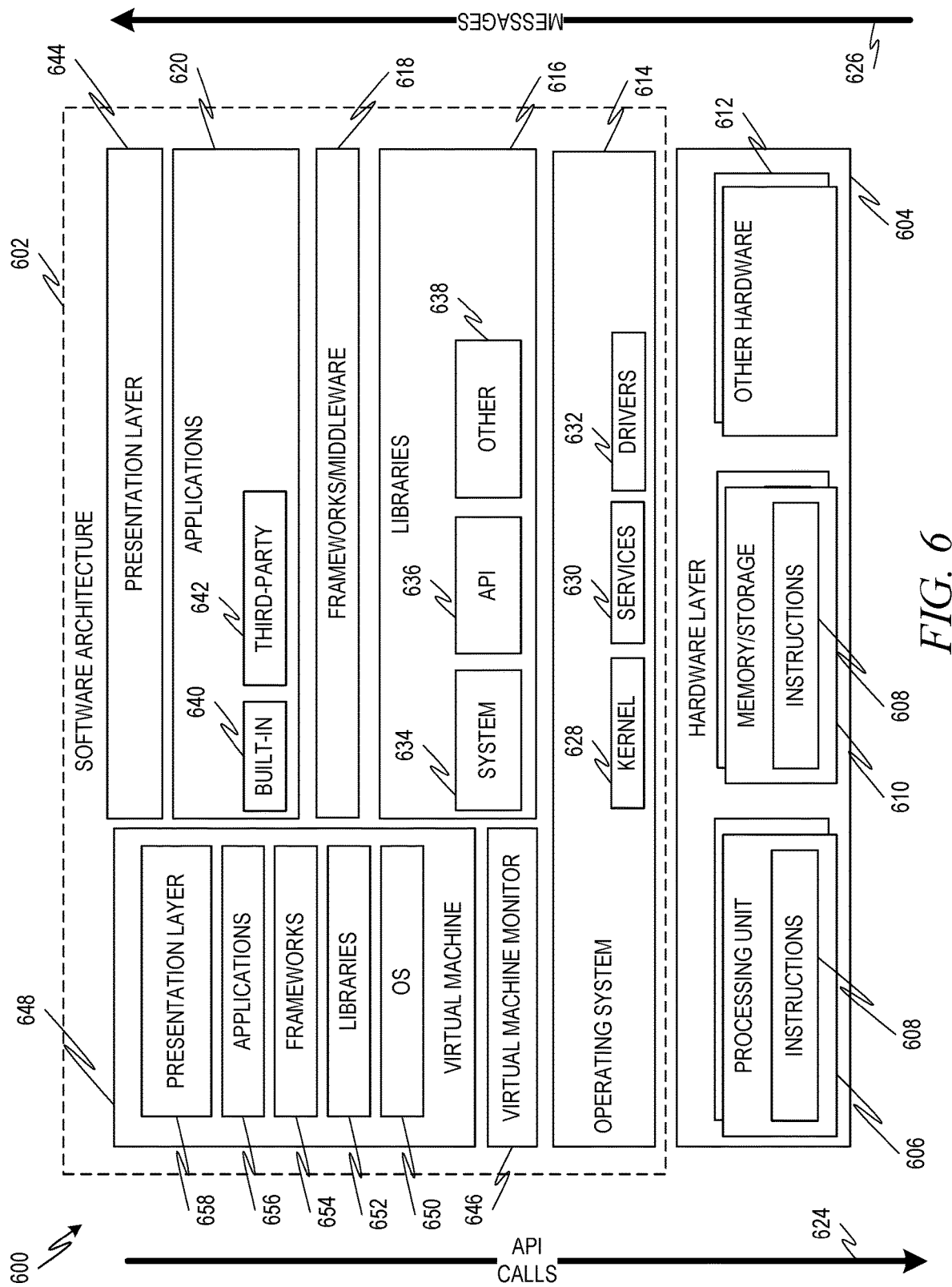
FIG. 6 is a block diagram showing one example of a software architecture for a computing device.

FIG. 6 is a block diagram 600 showing one example of a software architecture 602 for a computing device. The architecture 602 may be used in conjunction with various hardware architectures, for example, as described herein. FIG. 6 is merely a non-limiting example of a software architecture and many other architectures may be implemented to facilitate the functionality described herein. A representative hardware layer 604 is illustrated and can represent, for example, any of the above referenced computing devices. In some examples, the hardware layer 604 may be implemented according to the architecture of the computer system of FIG. 6.

The representative hardware layer 604 comprises one or more processing units 606 having associated executable instructions 608. Executable instructions 608 represent the executable instructions of the software architecture 602, including implementation of the methods, modules, subsystems, and components, and so forth described herein and may also include memory and/or storage modules 610, which also have executable instructions 608. Hardware layer 604 may also comprise other hardware as indicated by other hardware 612 which represents any other hardware of the hardware layer 604, such as the other hardware illustrated as part of the architecture 602.

In the example architecture of FIG. 6, the software architecture 602 may be conceptualized as a stack of layers where each layer provides particular functionality. For example, the software architecture 602 may include layers such as an operating system 614, libraries 616, frameworks/middleware 618, applications 620, and presentation layer 644. Operationally, the applications 620 and/or other components within the layers may invoke API calls 624 through the software stack and access a response, returned values, and so forth illustrated as messages 626 in response to the API calls 624. The layers illustrated are representative in nature and not all software architectures have all layers. For example, some mobile or special purpose operating systems may not provide a frameworks/middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of an interrupt and, in response, cause the architecture 602 to pause its current processing and execute an interrupt service routine (ISR) when an interrupt is accessed.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system 634 libraries (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) may provide a higher-level common infrastructure that may be utilized by the applications 620 and/or other software components/modules. For example, the frameworks 618 may provide various graphic user interface (GUI) functions, high-level resource management, high-level location services, and so forth. The frameworks 618 may provide a broad spectrum of other APIs that may be utilized by the applications 620 and/or other software components/modules, some of which may be specific to a particular operating system or platform.

The applications 620 includes built-in applications 640 and/or third-party applications 642. Examples of representative built-in applications 640 may include, but are not limited to, a contacts application, a browser application, a book reader application, a location application, a media application, a messaging application, and/or a game application. Third-party applications 642 may include any of the built-in applications 640 as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 642 may invoke the API calls 624 provided by the mobile operating system such as operating system 614 to facilitate functionality described herein.

The applications 620 may utilize built-in operating system functions (e.g., kernel 628, services 630 and/or drivers 632), libraries (e.g., system 634, APIs 636, and other libraries 638), and frameworks/middleware 618 to create user interfaces to interact with users of the system. Alternatively, or additionally, in some systems interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine as well as the interface with the host operating system (i.e., operating system 614). A software architecture executes within the virtual machine such as an operating system 650, libraries 652, frameworks/middleware 654, applications 656 and/or presentation layer 658. These layers of software architecture executing within the virtual machine 648 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-readable Medium

Figure 7:
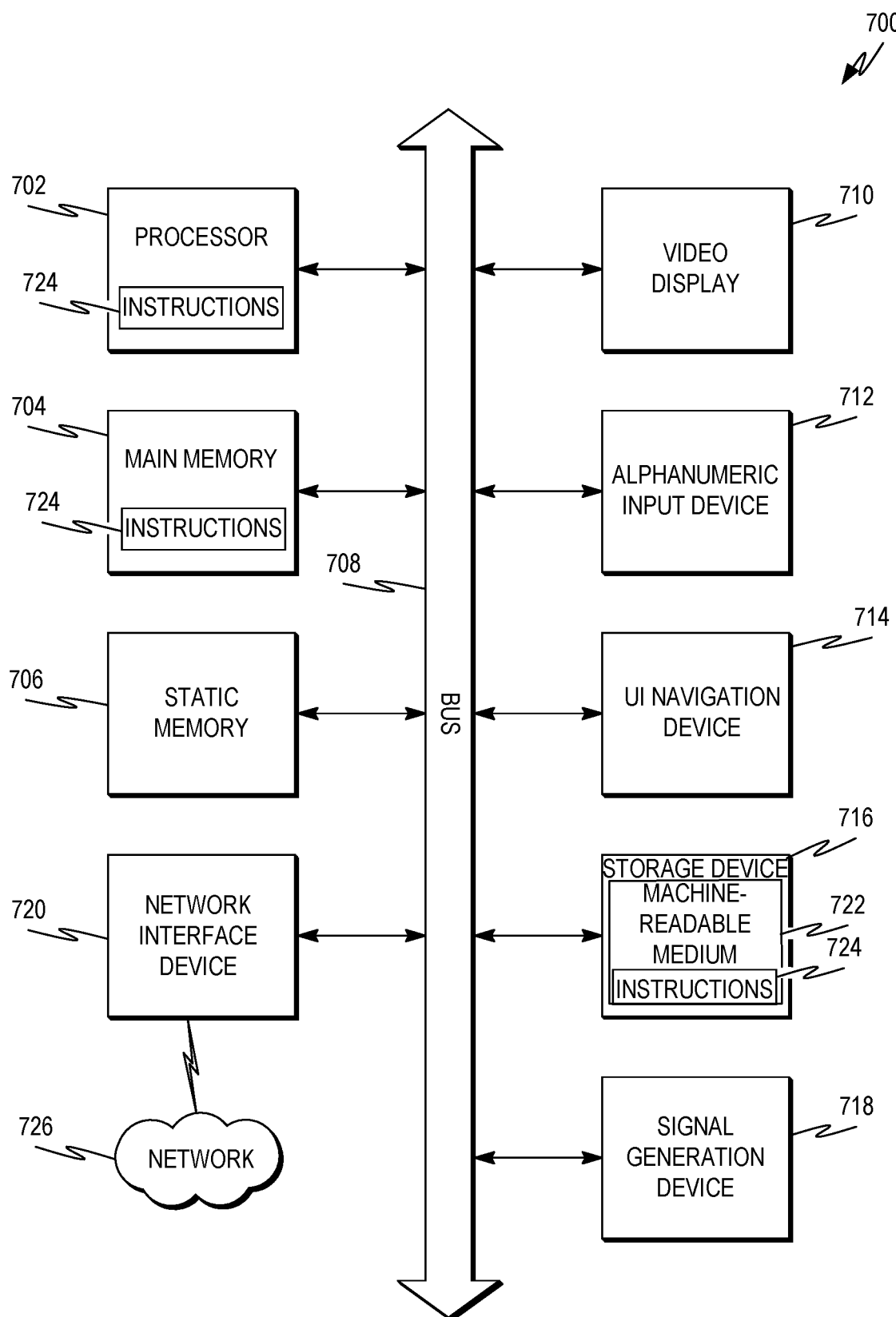
FIG. 7 is a block diagram of a machine in the example form of a computer system within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation (or cursor control) device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media 722.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for operating a database management system (DBMS) in a cloud environment, the system comprising:
   at least one processor at the cloud environment, the at least one processor programmed to perform operations comprising:
   receiving configuration metadata from an assembly worker executing at a first computing device remote from the cloud environment, the configuration metadata describing a configuration of a legacy DBMS, the legacy DBMS being configured to execute outside of the cloud environment;
   receiving, from the assembly worker, a first database protocol message generated by a process code executing at the first computing device;
   translating, by a translation engine executing at the cloud environment, the first database protocol message from a first format associated with the legacy DBMS to a second format associated with a DBMS instance executing at the cloud environment to generate a translated first database protocol message, the translating being based at least in part on the configuration metadata;
   causing, by the translation engine, the translated first database protocol message to be provided to the DBMS instance;
   receiving, from the DBMS instance, a first reply corresponding to the translated first database protocol message; and
   sending the first reply to the process code.

2. The system of claim 1, the operations further comprising:
   receiving, from the assembly worker, a second database protocol message generated by the process code;
   determining, by the translation engine, that the second database protocol message is compatible with the second format; and
   causing, by the translation engine, the second database protocol message to be provided to the DBMS instance.

3. The system of claim 2, the operations further comprising validating a sequence of the first database protocol message and the second database protocol message before causing the translated first database protocol message to be provided to the DBMS instance and before causing the second database protocol message to be provided to the DBMS instance.

4. The system of claim 1, the operations further comprising:
   decomposing, by the translation engine, the first database protocol message to generate a plurality of message segments; and
   reconstructing the plurality of message segments to generate the translated first database protocol message.

5. The system of claim 1, the first database protocol message comprising state data, the system the operations further comprising:
   storing the state data, by the translation engine; and
   incorporating, by the translation engine, the state data into the first reply before the first reply is sent to the process code.

6. The system of claim 1, the configuration metadata describing at least one configuration file used by the process code, the operations further comprising generating a mapping between the at least one configuration file used by the process code and at least one corresponding resource at the cloud environment.

7. The system of claim 6, the first database protocol message comprising a reference to a first configuration file, the operations further comprising using the mapping between the at least one configuration file used by the process code and at least one corresponding resource at the cloud environment to modify the first database protocol message to refer to a resource at the cloud environment corresponding to the first configuration file.

8. The system of claim 1, wherein translating the first database protocol message from the first format to the second format comprises modifying the first database protocol message to replace a reference to a first port to a reference to a corresponding port.

9. A method for operating a database management system (DBMS) in a cloud environment, the method comprising:
   receiving configuration metadata, at the cloud environment and from an assembly worker executing at a first computing device remote from the cloud environment, the configuration metadata describing a configuration of a legacy DBMS, the legacy DBMS being configured to execute outside of the cloud environment;

receiving, at the cloud environment and from the assembly worker, a first database protocol message generated by a process code executing at the first computing device;

translating, by a translation engine executing at the cloud environment, the first database protocol message from a first format associated with the legacy DBMS to a second format associated with a DBMS instance executing at the cloud environment to generate a translated first database protocol message, the translating being based at least in part on the configuration metadata;

causing, by the translation engine, the translated first database protocol message to be provided to the DBMS instance;

receiving, from the DBMS instance, a first reply corresponding to the translated first database protocol message; and sending the first reply to the process code.

10. The method of claim 9, further comprising:

receiving, from the assembly worker, a second database protocol message generated by the process code;

determining, by the translation engine, that the second database protocol message is compatible with the second format; and causing, by the translation engine, the second database protocol message to be provided to the DBMS instance.

11. The method of claim 10, further comprising validating a sequence of the first database protocol message and the second database protocol message before causing the translated first database protocol message to be provided to the DBMS instance and before causing the second database protocol message to be provided to the DBMS instance.

12. The method of claim 9, further comprising:

decomposing, by the translation engine, the first database protocol message to generate a plurality of message segments; and reconstructing the plurality of message segments to generate the translated first database protocol message.

13. The method of claim 9, the first database protocol message comprising state data, the method further comprising:

storing the state data, by the translation engine; and incorporating, by the translation engine, the state data into the first reply before the first reply is sent to the process code.

14. The method of claim 9, the configuration metadata describing at least one configuration file used by the process code, the method further comprising generating a mapping between the at least one configuration file used by the process code and at least one corresponding resource at the cloud environment.

15. The method of claim 14, the first database protocol message comprising a reference to a first configuration file, the method further comprising using the mapping between the at least one configuration file used by the process code and at least one corresponding resource at the cloud environment to modify the first database protocol message to refer to a resource at the cloud environment corresponding to the first configuration file.

16. The method of claim 9, wherein translating the first database protocol message from the first format to the second format comprises modifying the first database protocol message to replace a reference to a first port to a reference to a corresponding port.

17. A non-transitory machine-readable medium comprising instructions thereon that, when executed by at least one processor in a cloud environment, cause at least one processor at the cloud environment to perform operations comprising:

receiving configuration metadata from an assembly worker executing at a first computing device remote from the cloud environment, the configuration metadata describing a configuration of a legacy database management system (DBMS) configured to execute outside of the cloud environment;

receiving, from the assembly worker, a first database protocol message generated by a process code executing at the first computing device;

translating, by a translation engine executing at the cloud environment, the first database protocol message from a first format to a second format associated with a DBMS instance executing at the cloud environment to generate a translated first database protocol message, the translating being based at least in part on the configuration metadata;

causing, by the translation engine, the translated first database protocol message to be provided to the DBMS instance;

receiving, from the DBMS instance, a first reply corresponding to the translated first database protocol message; and sending the first reply to the process code.

18. The non-transitory machine-readable medium of claim 17, the operations further comprising:

receiving, from the assembly worker, a second database protocol message generated by the process code;

determining, by the translation engine, that the second database protocol message is compatible with the second format; and causing, by the translation engine, the second database protocol message to be provided to the DBMS instance.

19. The non-transitory machine-readable medium of claim 18, the operations further comprising validating a sequence of the first database protocol message and the second database protocol message before causing the translated first database protocol message to be provided to the DBMS instance and before causing the second database protocol message to be provided to the DBMS instance.

20. The non-transitory machine-readable medium of claim 17, the operations further comprising:

decomposing, by the translation engine, the first database protocol message to generate a plurality of message segments; and reconstructing the plurality of message segments to generate the translated first database protocol message.

* * * * *